United States Patent
Fujimoto

(10) Patent No.: US 10,367,573 B2
(45) Date of Patent: Jul. 30, 2019

(54) WIRELESS RELAY DEVICE, WIRELESS COMMUNICATION SYSTEM, AND INFORMATION SETTING METHOD

(71) Applicant: YOKOGAWA ELECTRIC CORPORATION, Tokyo (JP)

(72) Inventor: Naoyuki Fujimoto, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 167 days.

(21) Appl. No.: 15/107,706

(22) PCT Filed: Nov. 6, 2014

(86) PCT No.: PCT/JP2014/079465
§ 371 (c)(1),
(2) Date: Jun. 23, 2016

(87) PCT Pub. No.: WO2015/098309
PCT Pub. Date: Jul. 2, 2015

(65) Prior Publication Data
US 2016/0323030 A1 Nov. 3, 2016

(30) Foreign Application Priority Data

Dec. 26, 2013 (JP) .................. 2013-269933

(51) Int. Cl.
| | | |
|---|---|---|
| H04W 4/38 | (2018.01) | |
| H04W 4/50 | (2018.01) | |
| H04W 4/70 | (2018.01) | |
| H04B 7/155 | (2006.01) | |
| H04B 7/212 | (2006.01) | |
| H04W 48/10 | (2009.01) | |
| H04W 84/10 | (2009.01) | |

(52) U.S. Cl.
CPC ......... *H04B 7/15507* (2013.01); *H04B 7/212* (2013.01); *H04W 4/38* (2018.02); *H04W 4/50* (2018.02); *H04W 4/70* (2018.02); *H04W 48/10* (2013.01); *H04W 84/10* (2013.01)

(58) Field of Classification Search
CPC ................................ H04B 7/155507
USPC ........................................ 370/315
See application file for complete search history.

(56) References Cited

U.S. PATENT DOCUMENTS

2004/0229614 A1* 11/2004 Kim ............... H04W 48/02
455/435.1
2007/0197238 A1 8/2007 Nakajima
2010/0303073 A1* 12/2010 Kubo ............. H04L 12/1886
370/390

(Continued)

FOREIGN PATENT DOCUMENTS

EP 2 755 355 A1 7/2014
JP 2007-228249 A 9/2007

(Continued)

*Primary Examiner* — Brandon M Renner
*Assistant Examiner* — Abdeltif Ajid
(74) *Attorney, Agent, or Firm* — Sughrue Mion, PLLC

(57) ABSTRACT

A wireless relay device of one aspect of the invention includes a relay processor relaying setting data, which needs to have wireless devices join into a first wireless network, to a second wireless network assigned with an identifier different from that of the first wireless network, while the rely processor continues to relay data via the first wireless network.

8 Claims, 6 Drawing Sheets

(56) References Cited

U.S. PATENT DOCUMENTS

| | | | |
|---|---|---|---|
| 2011/0090801 A1* | 4/2011 | Oku | H04L 12/14 |
| | | | 370/246 |
| 2011/0110291 A1* | 5/2011 | Ishii | H04B 7/155 |
| | | | 370/315 |
| 2014/0192766 A1 | 7/2014 | Akisada et al. | |

FOREIGN PATENT DOCUMENTS

| | | |
|---|---|---|
| JP | 2012-142842 A | 7/2012 |
| JP | 2013-070360 A | 4/2013 |
| JP | 2013-078107 A | 4/2013 |

* cited by examiner

WIRELESS RELAY DEVICE, WIRELESS COMMUNICATION SYSTEM, AND INFORMATION SETTING METHOD

TECHNICAL FIELD

The present invention relates to a wireless relay device, a wireless communication system, and an information setting method.

The present application claims priority based on Japanese Patent Application No. 2013-269933, filed on Dec. 26, 2013, the contents of which are incorporated herein by reference.

BACKGROUND ART

In recent years, a wireless communication system has been implemented in plants or factories. The wireless communication system includes installed on-site devices for a wireless communication such as measuring devices, and operation devices, referred to as wireless field devices. The wireless communication system communicates a control signal for controlling wireless field devices and a measurement signal obtained by the wireless field devices via a wireless network. Communication standards used in the wireless communication system can, for example, be industrial wireless communication standards such as ISA100.11a or Wireless HART (registered trademark).

In order to join the wireless devices such as the wireless field devices into the wireless network, an operation is performed for setting the wireless devices with a set of device information such as setting data: network parameters and security parameters, which is referred to as provisioning. The methods of the provisioning can be broadly classified into an OTA (Over The Air) provisioning and an OOB (Out-Of-Band) provisioning. The OTA provisioning includes a process for setting a set of device information using the wireless communication via the wireless network. The OOB provisioning includes a process for setting a set of device information using a different communication from the wireless communication via the wireless network, wherein the different communication can be, for example, cable or wired communications and infrared communications.

For joining into the wireless network, the wireless devices, to which the provisioning has been performed, transmit a join-request, such as the join-request into the wireless network, to a management device of the wireless communication system. The management device receives the join-request and then performs an authentication using information included in the join-request, for example, a join key. If the authentication succeeds, then the management device permits the wireless devices, which transmitted the join-request, to join into the wireless network. If the authentication fails, the management device rejects the wireless devices to join into the wireless network. In this way, the joining into the wireless network is performed.

Patent Reference 1 discloses an example of the provisioning for the wireless devices to join into the wireless network, wherein the provisioning is the OTA provisioning. Patent Reference 2 discloses an example of the provisioning for the wireless devices to join into the wireless network using the provisioning devices such as device information setting tools, wherein the provisioning is the OOB provisioning.

The OOB provisioning is performed in such a state that the provisioning devices connect with or close to targeted wireless devices. Therefore, there are some problems that in a case that the targeted wireless devices are installed in a place such as an explosion-proof area where explosion-proof is required, it is difficult that the provisioning devices connect with or close to the wireless devices because of explosion-proof. Even if the performance targeted wireless devices are installed in a place where the explosion-proof is not required such as non-explosion-proof area, there are some problems that it is difficult that the provisioning devices connect with or close to the wireless devices depending on an installed area of the wireless devices. For example, if the wireless devices are installed on a high place, the provisioning workability is sometimes remarkably decreasing.

When the OOB provisioning is performed, the information, which is set to the wireless devices by using the provisioning devices, also needs to be set to the management device of the wireless communication system. The provisioning is the operation performed by on-site workers. The information setting to the management devices is the operation performed by persons such as plant operators who is different from the on-site workers. Therefore, after the provisioning for the wireless devices was completed, then the on-site workers have to hand over the information which was set to the wireless devices to the plant operators. However, if the information to be handed over is not handed over between the on-site workers and the plant operators, any confusion can occur.

In contrast, the OTA provisioning is performed by the wireless communication via the wireless network. Thus, the provisioning may be performed regardless of whether or not the wireless devices are installed in the explosion-proof area. However, the OTA provisioning uses wireless signals having the same frequency band as for the wireless network. Thus, there can be caused an interference with the wireless communication in the wireless network.

PRIOR ART REFERENCE

Patent Reference

[Patent Reference 1] Japanese Patent Application Laid-Open Publication No. 2013-078107
[Patent Reference 2] Japanese Patent Application Laid-Open Publication No. 2012-142842

SUMMARY OF THE INVENTION

Problem to Be Solved By the Invention

One aspect of the present invention is to provide a wireless relay device, a wireless communication system, and an information setting method, which can easily perform information-setting to join into the wireless network, without interference with the wireless communication over the wireless network.

Means to Solve the Problem

A wireless relay device of one aspect of the invention may include a relay processor relaying a setting data, which needs to have wireless devices join into a first wireless network, to a second wireless network assigned with an identifier different from that of the first wireless network, while the rely processor continues to relay data via the first wireless network.

Above stated wireless relay device may further include a first advertisement transmitter transmitting, to the first wireless network, information as a first advertisement, information as the first advertisement being used to communicably connect the wireless devices to the first wireless network, the wireless devices having been set with the setting data, and a second advertisement transmitter transmitting, to the second wireless network, the information as a second advertisement, information as the second advertisement being used to communicably connect the wireless devices to the second wireless network, the wireless devices being to be set with the setting data.

In the above stated wireless relay device, the second advertisement transmitter is configured to switch whether or not to transmit the second advertisement based on a control signal having been transmitted via the first wireless network.

In the above stated wireless relay device, the relay processor may relay, in the first wireless network, data indicating a join-request to join into the first wireless network in a case that data as a response to the first advertisement indicating the join-request has been transmitted from the wireless devices via the first wireless network, and the relay device may relay, to the first wireless network, data indicating another join-request to join into the second wireless network in another case that data as a response to the second advertisement indicating the other join-request has been transmitted from the wireless devices via the second wireless network.

A wireless communication system of one aspect of the invention may include a wireless relay device providing a relay processor relaying a setting data, which needs to have wireless devices join into a first wireless network, to a second wireless network assigned with an identifier different from that of the first wireless network, while the rely processor continues to relay data via the first wireless network, and a management device managing the first wireless network and the second wireless network.

In the above stated wireless communication system, the wireless relay device may further include a first advertisement transmitter transmitting, to the first wireless network, information as a first advertisement, information as the first advertisement being used to communicably connect the wireless devices to the first wireless network, the wireless devices having been set with the setting data, and a second advertisement transmitter transmitting, to the second wireless network, information as a second advertisement, the information as the second advertisement being used to communicably connect the wireless devices to the second wireless network, the wireless devices being to be set with the setting data, the second advertisement transmitter switching whether or not to transmit the second advertisement based on a control signal having been transmitted via the first wireless network.

In the above stated wireless communication system, the management device may transmit, to the wireless relay device, the control signal to control starting or stopping transmission of the second advertisement.

In the above stated wireless communication system, the management device may transmit the control signal to control starting or stopping transmission of the second advertisement, based on instructions from outside.

In the above stated wireless communication system, the above stated wireless relay device may further include the first advertisement transmitter transmitting, to the first wireless network, information as the first advertisement, the information as the first advertisement being used to communicably connect the wireless devices to the first wireless network, the wireless devices having been set with the setting data, and the second advertisement transmitter transmitting, to the second wireless network, information as the second advertisement, the information as the second advertisement being used to communicably connect the wireless devices to the second wireless network, the wireless devices being to be set with the setting data.

The relay processor may relay, in the first wireless network, data indicating a join-request to join into the first wireless network in a case that data as a response to the first advertisement indicating the join-request has been transmitted from the wireless devices via the first wireless network, and the relay processor may relay, to the first wireless network, data indicating another join-request to join into the second wireless network in another case that data as a response to the second advertisement indicating the other join-request has been transmitted from the wireless devices via the second wireless network.

The above stated wireless communication system may further include wireless devices transmitting data indicating the join-request to join into the first wireless network to the wireless relay device in a case that the wireless devices receive the first advertisement which is transmitted from the wireless relay device with the setting data having been set, and transmitting the data indicating the join-request to join into the second wireless network to the wireless relay device in a case that the wireless devices receive the second advertisement which is transmitted from the wireless relay device with the setting data not having been set.

The setting method of one aspect of the invention, transmitting a setting data, which needs to have wireless devices join into a first wireless network, to the first wireless network, relaying the setting data via the first wireless network to the second wireless network while the relay processor continues to relay data via the first wireless network, and setting with the setting data to the wireless devices which is communicably connected to the second wireless network.

The information setting method may further include transmitting the setting data to the first wireless network, relaying the setting data to the second wireless network, and having the wireless devices communicably connect to the second wireless network before setting with the setting data to the wireless devices.

The information setting method may further include transmitting, to the first wireless network, information as the first advertisement, the information as the first advertisement being used to communicably connect the wireless devices to the first wireless network, after setting with the setting data to the wireless devices.

The information setting method may further include transmitting, to the second wireless network, information as a second advertisement, the information as the second advertisement being used to communicably connect the wireless devices to the second wireless network, the wireless devices being to be set with the setting data, before transmitting the setting data to the first wireless network.

The information setting method may further include switching whether or not to transmit the second advertisement based on a control signal having been transmitted via the first wireless network.

Effect of the Invention

According to one aspect of the present invention, because the wireless relay device relays the setting data required to have the wireless devices join into the first wireless network while continuing the relay the data via the first wireless network, the wireless relay device can easily set an information required to join into the wireless network to the wireless devices, without an interference with the wireless communication in the first wireless network.

EMBODIMENT FOR CARRYING OUT THE INVENTION

A wireless relay device, a wireless communication system, and an information setting method according to the one embodiment of the present invention will be described below, with references made to the drawings.

<Wireless Communication System>

Figure 1:
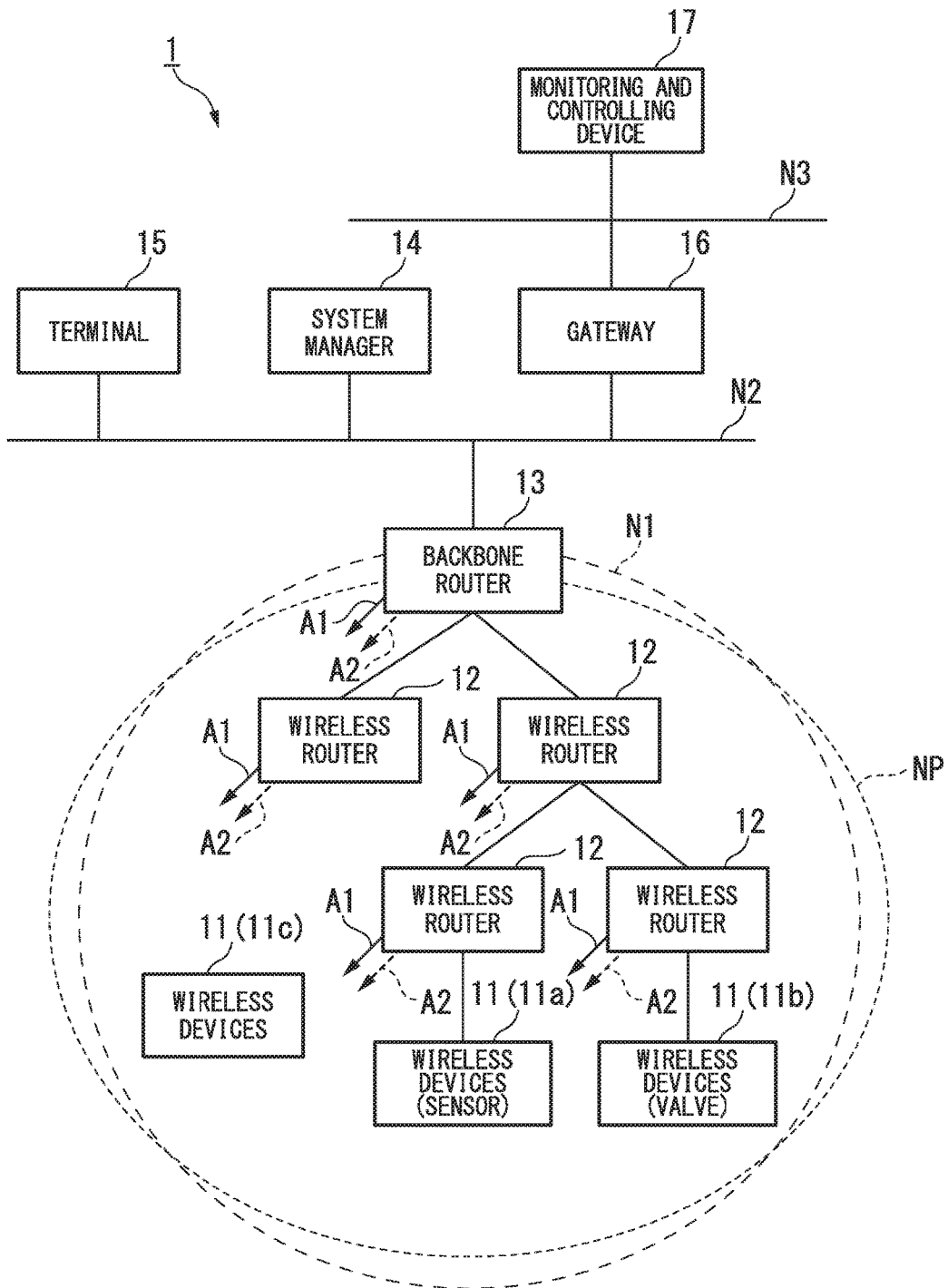
FIG. 1 is a block diagram showing the overall configuration of a wireless communication system according to a first embodiment of the present invention.

FIG. 1 is a block diagram showing the overall configuration of a wireless communication system according to the first embodiment of the present invention. As shown in FIG. 1, the wireless communication system 1 of the first embodiment includes a wireless devices 11, a wireless router 12 as a wireless relay device, a backbone router 13 as a wireless relay device, a system manager 14 as a management device, a terminal 15, a gateway 16, and a monitoring and controlling device 17.

The above-stated wireless communication system 1 can communicate wirelessly adopting the TDMA (Time Division Multiple Access) system via a target network N1 as a first wireless network or a provisioning network NP as a second wireless network. The wireless communication system 1 is constructed, for example, in a plant or factory which is referred to collectively hereinafter as simply "a plant". The plant includes an industry plant such as a chemical plant or the like, a plant managing and controlling a well-site such as a gas-field and oil-field or the like and surrounding area, a plant managing and controlling a hydraulic-power generation, a thermal-power generation, and a nuclear-power generation, a plant managing and controlling an environmental-power generation such as a solar-power and a wind-power, a plant managing and controlling a water and sewer, and a dam or the like.

The target network N1 is implemented by the devices installed in the on-site of the plant such as the wireless devices 11, the wireless router 12, and the backbone router 13, and is a current wireless network managed by the system manager 14. The number of the wireless devices, the wireless routers, and the backbone routers, included in the target network N1, is arbitrary.

The provisioning network NP is an auxiliary wireless network provided to perform the OTA (Over The Air) provisioning to have the wireless devices 11 join into the target network N1. That is, the provisioning network NP is the auxiliary wireless network. The auxiliary wireless network sets a provisioning information to the wireless devices 11 which is about to join into the target network N1. The provisioning information is a device information such as a setting data, which is required for the wireless devices 11 to join into the target network N1. The provisioning network NP is implemented by the devices such as the wireless devices 11, wireless router 12, and the backbone router 13, installed in the on-site of the plant, and is managed by the system manager 14, in a similar way to the target network N1.

Each of the target network N1 and the provisioning network NP is a wireless subnet constituting the wireless network provided in the wireless communication system 1, and each is assigned subnet IDs as identifiers different from each other. For example, the provisioning network NP is assigned with a subnet ID of which the value is "1", the target network N1 is assigned with one of subnet IDs of which the values are "2" to "65535 (0xFFFF)", respectively.

The plant constructed the wireless communication system 1 includes a backbone network N2 and a control network N3 in addition to the target network N1 and the provisioning network NP. The backbone network N2 is a main wired network of the wireless communication system. The backbone router 13, the system manager 14, the terminal 15, and the gateway 16 are connected to the backbone network N2. The control network N3 is a wired network positioned higher than the backbone network N2. The gateway 16 and the monitoring and controlling device 17 are connected to the control network N3. The backbone network N2 and the control network N3 may be implemented by the wireless communication network.

The wireless devices 11 are installed in the on-site of the plant, and are field devices such as wireless field devices operating a measurement and an operation required to processing control under the control of the monitoring and controlling device 17. Specifically, the wireless devices 11 are, for example, sensors such as a flow gauge or a temperature sensor, valves such as a flow rate control valve or an open and close value, actuators such as a fan or a motor, imaging devices such as a camera and a video or the like, taking a picture of a situation in the plant or the target, audio devices such as a microphone or a speaker or the like, collecting an abnormal noise or the like in the plant, or emitting an alarm sound or the like, position detecting devices emitting a position information of each device, or other devices. The wireless devices 11 perform a power-saving operation such as an intermittent operation, using a battery as a power source, and can communicate wirelessly adopting the TDMA system conforming to ISA100.11a.

In the first embodiment, in order to facilitate the understanding, descriptions will be provided for an example in which the state quantity in the processing to be controlled is a flow rate of fluid. Therefore, FIG. 1 shows one sensor 11a which is the wireless devices 11 measuring a flow amount, and one valve 11b which is the wireless devices 11 operating the flow amount. In order to facilitate the understanding, a sensor 11a and a valve 11b have already been joined into the target network N1, the provisioning has not yet been performed to a wireless device 11c, and is joined neither the target network N1 nor the provisioning network NP. However, the wireless device 11c joins into the provisioning network NP when the OTA provisioning performs, and joins the target network N1 under the control of the system manager 14 after the OTA provisioning is performed.

Specifically, the wireless device 11c tries to join into the provisioning network NP by transmitting data indicating a join-request for the provisioning network NP to the system manager 14 when an advertisement A2 (the details will be described later) is received from the wireless router 12 or the backbone router 13 in the state that a setting of the provisioning information is not performed. The wireless device 11c tries to join into the target network N1 by transmitting data indicating a join-request for the target network N1 to the system manager 14 when an advertisement A1 (the details will be described later) is received from the wireless router 12 or the backbone router 13 in the state that a setting of the provisioning information is performed.

The provisioning information includes "an EUI64", "a join key", "a network ID", and "a tag information" or the like. The EUI64 is a 64 bits information as an identification information previously allocated to each of the wireless devices 11 to uniquely identifies the wireless devices 11. The join key is information equivalent to a password which is required when the wireless devices 11 joins into the target network N1. The network ID is identifiers previously allocated to the target network N1 to identify the target network N1.

The tag information is an ID to identify the wireless devices 11, and is information set to each of the wireless devices so that the plant operators operating the monitoring and controlling device 17 can easily identify the wireless devices 11. For example, if the wireless devices 11 are replaced, the EUI64 of the wireless devices 11 is different before and after the replacement. The tag information of the wireless devices 11 to be replaced can be set on the wireless devices 11 as replaced, to identify the wireless devices 11 as replaced in the same way of identifying the wireless devices 11 to be replaced. The same information as the provisioning information set to the wireless device 11c is stored in the system manager 14. The same information can be used in the joining process to have the wireless device 11c join into the target network N1.

The wireless router 12, can communicate wirelessly conforming to the wireless communication standards ISA 100.11a, is communicably connected to the target network N1 and the provisioning network NP. The wireless router 12 relays the data via the target network N1. The wireless router 12 relays the information required to the provisioning of the wireless devices 11 (11c) while continuing to relay the data via the target network N1. That is, the wireless router 12 can perform a relay processing of the information required to the provisioning of the wireless devices 11 (11c) without giving an influence such as the interference to the relay processing of the data via the target network N1.

Specifically, the wireless router 12 relays the provisioning information, which is the setting data to be set to the wireless devices 11 (11c), received via the target network N1 to the provisioning network NP, while continuing to relay the data via the target network N1. The wireless router 12 relays the data, such as the data indicating the join-request into the provisioning network NP, received via the provisioning network NP to the target network N1, while continuing to relay the data via the target network N1. The wireless router 12 relays the data in the target network N1 when the data indicating the join-request into the target network N1 is received via the target network N1.

The wireless router 12 transmits periodically the advertisement A1 (Router Advertisement) as a first advertisement to the target network N1. The wireless router 12 transmits periodically the advertisement A2 as a second advertisement to the provisioning network NP, under the control of the system manager 14. The advertisement A1 in which the wireless router 12 transmits to the target network N1 is the information to have the wireless devices 11 (11c) finished the provisioning connect to the target network N1. In contrast, the advertisement A2 in which the wireless router 12 transmits to the provisioning network NP is the information to have the wireless devices 11 (11c) not performing the provisioning connect to the provisioning network NP. The internal configuration of the wireless router 12 will be described later.

The backbone router 13 connects the target network N1 and the provisioning network NP with the backbone network N2, relays the data transmitted and received between the target network N1 and the provisioning network NP with the backbone network N2. The backbone router 13 can also communicate wirelessly conforming to the wireless communication standards ISA 100.11a.

The backbone router 13, in a similar way to the wireless router 12, relays the information required to the provisioning of the wireless devices 11 (11c) while continuing to relay the data via the target network N1. The backbone router 13 transmits periodically the advertisement A1 to the target network N1, and transmits periodically the advertisement A2 to the provisioning network NP, under the control of the system manager 14.

The system manager 14 controls to communicate wirelessly via the target network N1 and the provisioning network NP. Specifically, the system manager 14 performs an allocation control of communication resources such as timeslots and communication channels for the wireless devices 11, the wireless router 12, the backbone router 13, and the gateway 16. The system manager 14 implements the wireless communication adopting the TDMA system via the target network N1. The system manager 14 allocates the communication resources so that the interferences do not occur between the data via the target network N1 and the data via the provisioning network NP.

The system manager 14 performs a joining processing such as the joining whether or not the wireless devices 11 (11c) join into the target network N1 or the provisioning network NP. In addition, the system manager 14 performs a setting processing such as the OTA provisioning to set the provisioning information via the provisioning network NP to the wireless devices 11 (11c) joined into the provisioning network NP.

The system manager 14 allocates the communication resources regarding the above mentioned advertisement A1 and A2 to the wireless router 12 and the backbone router 13. Specifically, the wireless router 12 and the backbone router 13 allocate the communication resources to transmit each of the advertisement A1 for the target network N1 and the advertisement A2 for the provisioning network NP, and allocate the communication resources to which the wireless router 12 and the backbone router 13 receive a connection request from the wireless devices 11 (11c) received the advertisement A1 and A2. The details of the allocation of the communication resources regarding an advertisement will be described later.

Further, the system controls the start of the transmission of the advertisement A2 for the provisioning network NP or stop of the transmission of the advertisement A2 for the provisioning network NP, based on the instructions from the terminal 15. Specifically, the system manager 14 controls the start of the transmission or the stop of the transmission of the advertisement A2 by transmitting the control signal controlling the start of the transmission of the advertisement A2 or the control signal controlling of the stop of the transmission of the advertisement A2 for the wireless router 12 and the backbone router 13.

The terminal 15 is operated, for example, by plant operators, and is used to monitor and control the wireless communication system 1. Specifically, the terminal 15 includes an input device such as keyboards or pointing devices, and a display such as liquid-crystal displays. The terminal 15 displays a management information of the system manager 14 on the displays and provides the management information for the operators. Then the operators input instructions to the terminal 15 by operating the input device, and terminal 15 outputs the instructions to the system manager 14. The system manager 14 controls the wireless communication system 1 based on the instructions. The operators input for example, the instructions of start of the transmission or the stop of the transmission of the advertisement A2 to the terminal 15.

The gateway 16 connects the backbone network N2 to the control network N3, and relays various data transmitted and received between the wireless devices 11, the system manager 14 or the like and the monitoring and controlling device 17. The gateway 16 can connect the backbone network N2 with the control network N3 each other while maintaining a security.

The monitoring and controlling device 17 monitors and manages the wireless devices 11 or the like. Specifically, the monitoring and controlling device 17 collects a measured data, such as flow rate value measured by the sensor 11a, from the wireless devices 11 via the gateway 16. And then monitoring and controlling device 17 monitors the wireless devices 11 or the like. The monitoring and controlling device 17 calculates control amount, such as a valve opening degree of a valve 11b, of the wireless devices 11 based on the collected the measured data and transmits the control the data indicating the control amount at a specified time interval to the wireless devices 11 via the gateway 16 to control the wireless devices 11, such as the valve 11b.

<Wireless Router>

Figure 2:
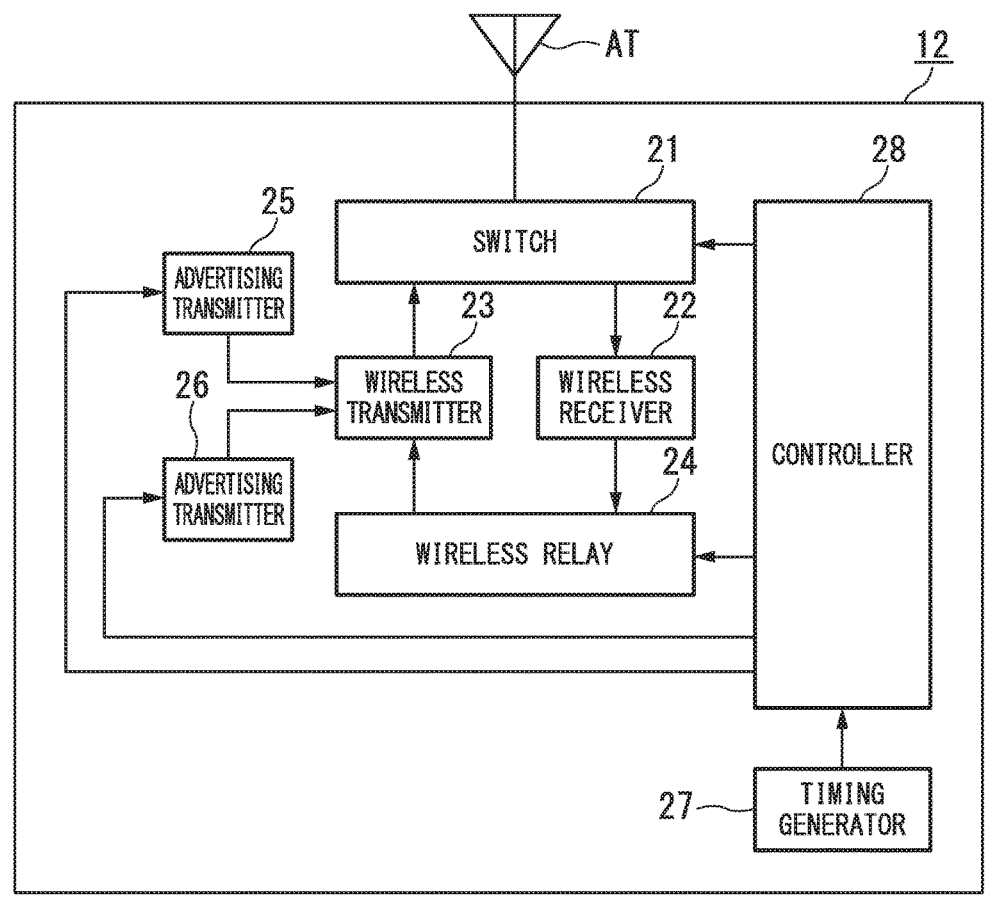
FIG. 2 is a block diagram showing the main configuration of a wireless router as a wireless repeater according to the first embodiment of the present invention.

FIG. 2 is a block diagram showing the main configuration of a wireless router as a wireless relay device according to the first embodiment of the present invention. As shown in FIG. 2, the wireless router 12 includes an antenna AT, a switch 21, a wireless receiver 22, a wireless transmitter 23, a wireless relay device 24 as a relay processor, an advertisement transmitter 25 as a first advertisement transmitter, an advertisement transmitter 26 as a second advertisement transmitter, a timing generator 27, and a controller 28. And the wireless router 12 transmits and receives wireless signal via the antenna AT, and relays the data via the target network N1.

The switch 21 includes switches such as analog switches, switches whether or not to connect the wireless receiver 22 to the antenna AT, or to connect the wireless transmitter 23 to the antenna AT, under the control of the controller 28. Specifically, the switch 21 switches so that the wireless receiver 22 is connected to the antenna AT when the wireless signal is received, and switches so that the wireless transmitter 23 is connected to the antenna AT when the wireless signal is transmitted.

The wireless receiver 22 performs a receiving processing to the receiving signal via the switch 21 received by the antenna AT, and outputs the information, referred to as a receiving information, including the receiving signal to the wireless relay device 24. The wireless transmitter 23 performs a transmitting processing to a signal to be transmitted as the wireless signal from the antenna AT. Specifically, the wireless transmitter 23 performs the transmitting processing to the signal to be outputted from the wireless relay device 24, the signal outputted from the advertisement transmitter 25 and 26, and outputs them to the switch 21.

The wireless relay device 24 performs the relay processing to the data via the target network N1 and the provisioning network NP. Specifically, the wireless relay device 24 determines a transmission path in accordance with a destination of transmission included in the received information to be outputted from the wireless receiver 22, and then performs an outputting processing to the received information to which the transmission path is determined to the wireless transmitter 23. The wireless relay device 24, in a case that the provisioning information is received via the target network N1, performs the relay processing to relay the provisioning information to the provisioning network NP, while continuing to relay the data via the target network N1, under the control of the controller 28. That is, the wireless relay device 24 performs the relay processing to relay the provisioning information to the provisioning network NP, while relaying the data via the target network N1 in accordance with a communication schedule such as timing.

In a case that the data, such as the data indicating a join-request for the provisioning network NP, is transmitted via the provisioning network NP, the wireless relay device 24 performs the relay processing to relay the data to the target network N1 while continuing to relay the data via the target network N1. In a case that the data indicating a join-request into the target network N1 is received via the target network N1, the wireless relay device 24 relays the data in the target network N1.

The advertisement transmitter 25 transmits the advertisement A1 to the target network N1, by outputting the information of the advertisement A1 to be transmitted to the target network N1, to the wireless transmitter 23, under the control of the system manager 14. The advertisement transmitter 26 transmits the advertisement A2 to the provisioning network NP, by outputting the information of the advertisement A2 to be transmitted to the provisioning network NP, to the wireless transmitter 23, under the control of the controller 28. The advertisement transmitter 26 switches whether or not to transmit the advertisement A2 by the control of the controller 28.

The timing generator 27 generates a timing signal defining an operation timing of the wireless router 12. The controller 28 operates synchronized with the timing signal generated by the timing generator 27, overall controls the operation of the wireless router 12. Specifically, the controller 28 controls the wireless relay device 24 and performs a switching control of the switch 21 based on the transmitting and receiving timing of the wireless signal pre-defined by the system manager 14. Moreover, the controller 28 controls the advertisement transmitter 26 based on the control signal from the system manager 14, or stops transmitting of the advertisement A2.

The backbone router 13 is almost similar configuration with the wireless router 12, except that the data can be relayed between the target network N1, the provisioning network NP and the backbone network N2. Thus, the backbone router 13 has such a combined configuration that the configuration shown in FIG. 2 is combined with a relay configuration to relay the data between the target network N1 or the provisioning network NP and the backbone network N2.

A communication resource regarding the advertisement allocated by the system manager 14 will be described. FIG.

Figure 3:
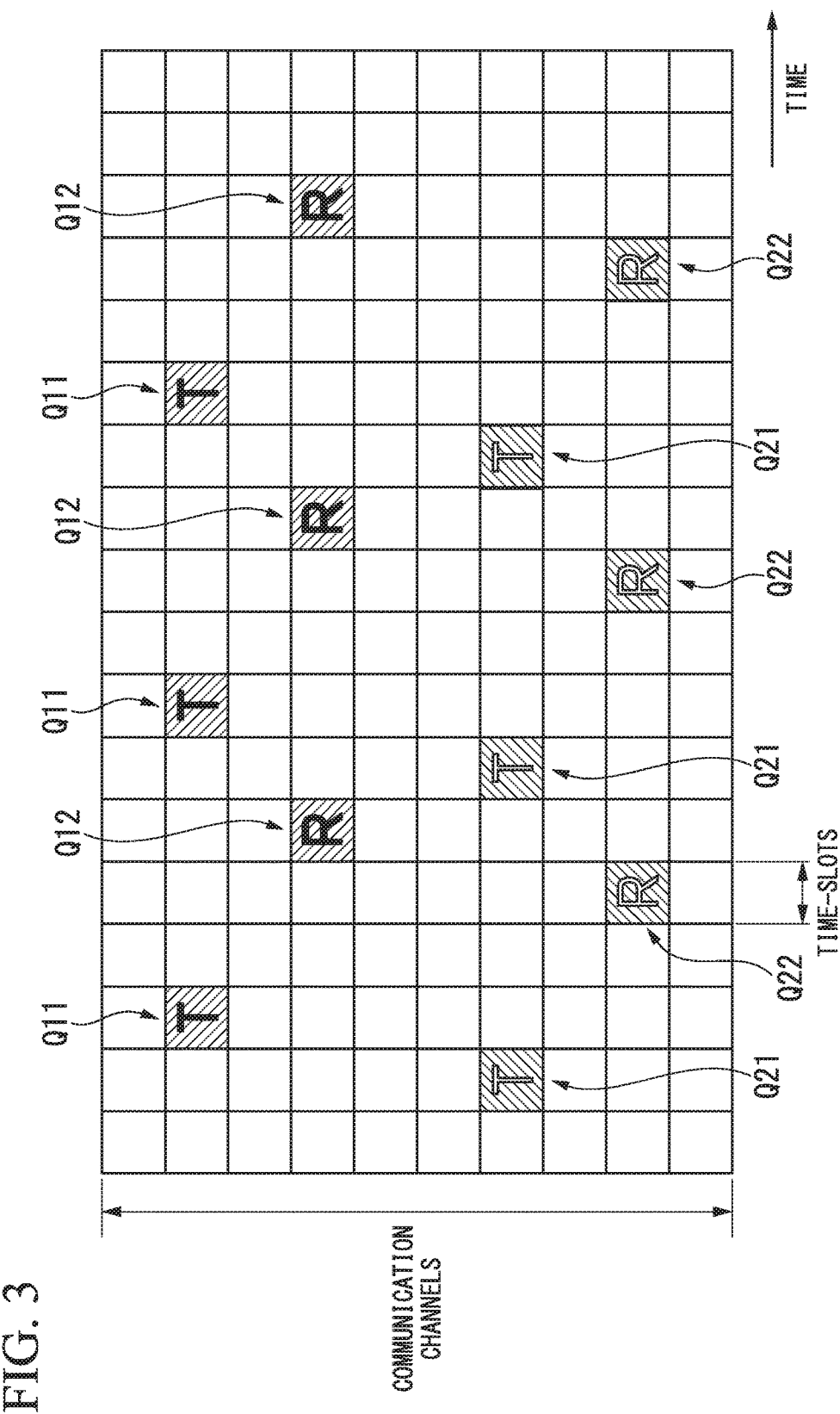
FIG. 3 is a drawing for describing communication resources regarding to an advertisement allocated in the first embodiment of the present invention.

3 is a drawing for describing communication resources regarding to the advertisement allocated in the first embodiment of the present invention. In FIG. 3, the horizontal axis represents time and the vertical axis represents channels. In FIG. 3, each block in the horizontal direction indicates a time slot, and each block in the vertical direction indicates a communication channel. However, to simplify the illustration, only 10 communication channels are shown in FIG. 3.

In FIG. 3, blocks marked Q11 which are blocks with hatching and black character "T" indicates the communication resources for transmission allocated based on the advertisement A1, and blocks marked Q12 which are blocks with hatching and black character "R" indicate the communication resources for reception allocated based on the advertisement A1. In contrast, blocks marked Q21 which are blocks with hatching and void character "T" indicate the communication resources for transmission allocated based on the advertisement A2, and blocks marked Q22 which are blocks with hatching and void character "R" indicate the communication resources for reception allocated based on the advertisement A2.

In the example shown in FIG. 3, both time slots and communication channels of the communication resources allocated based on the advertisement A2 are different from those of the communication resources allocated based on the advertisement A1. In the present first embodiment, the communication resources are allocated so that the wireless communication of the wireless devices 11 (11a and 11b) which were already joining into the target network N1 do not interfere with the wireless devices 11 (11c) which is about to join into the target network N1 or the provisioning network NP.

<Joining Operation into the Wireless Communication System>

Figure 4:
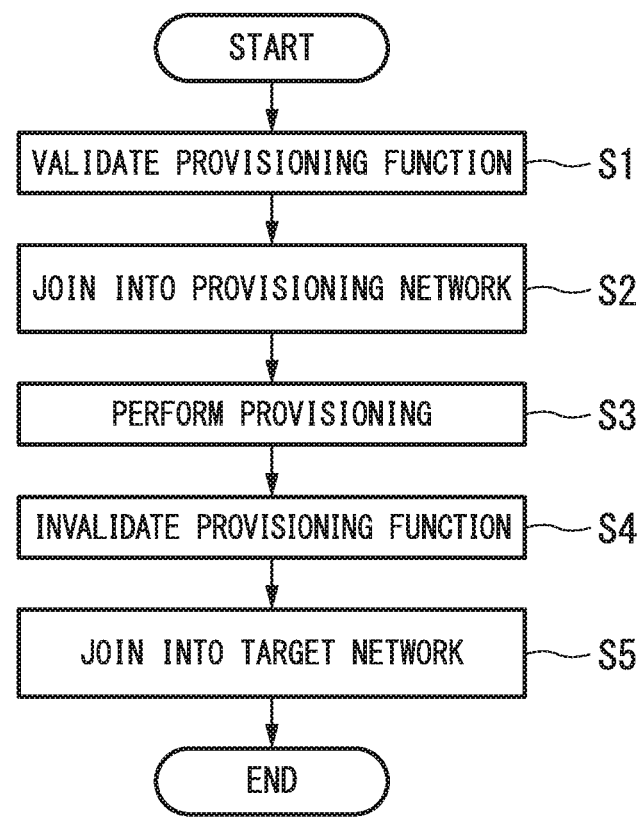
FIG. 4 is a flowchart showing a joining sequence into the wireless communication system according to the first embodiment of the present invention.

Next, an operation in a case that the wireless device 11c joins into the above described wireless communication system 1 will be described. FIG. 4 is a flowchart showing a joining sequence into the wireless communication system according to the first embodiment of the present invention. To simplify the description, the wireless device 11c which is about to join into the wireless communication system, as shown in FIG. 1, is installed in the target network N1 and the provisioning network NP.

Because the wireless device 11c is in an initial state with no provisioning, only the EUI 64 of the provisioning information is allocated, and another provisioning information such as the join key, the network ID, and the tag information, are not set. However, the join key described above and an initial join key which is different from the join key are set to the wireless device 11c. The join key is set by the provisioning, and the initial join key is used for joining into the provisioning network NP.

In other words, the tag information and the network ID are previously set in the system manager 14, as the provisioning information to be set to the wireless device 11c. The network ID which is set to the system manager 14 characterizes the target network N1 into which the wireless device 11c is about to join.

Figure 5:
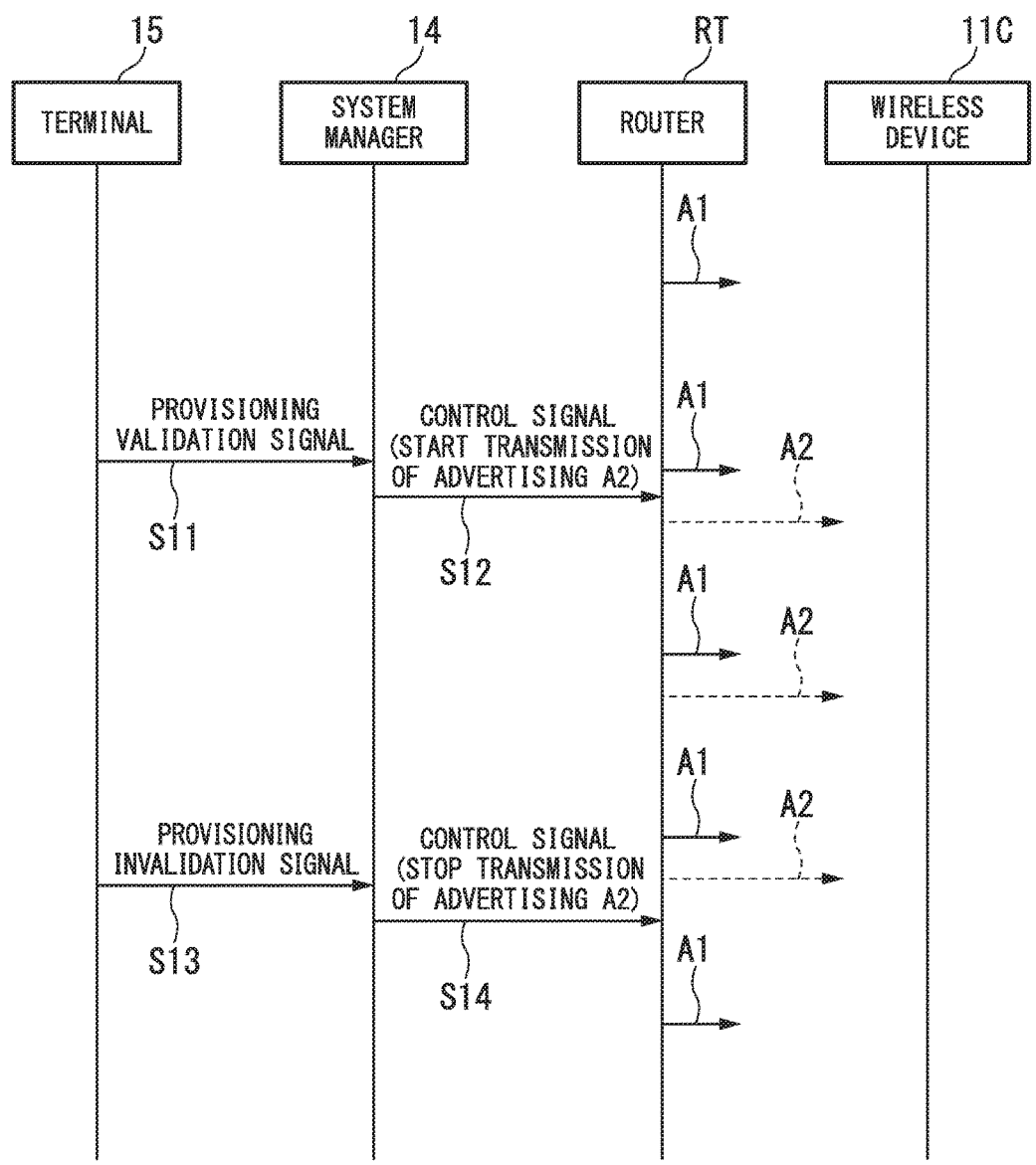
FIG. 5 is a timing diagram showing a validation and an invalidation of the provisioning function of the wireless communication system according to the one embodiment of the present invention.

When the wireless device 11c is about to join into the wireless communication system 1, firstly, a validation processing of the provisioning function of the wireless communication system is performed (Step S1). This processing is performed based on the instructions from the plant operators. FIG. 5 is a timing diagram showing the validation and invalidation of the provisioning function of the wireless communication system according to the one embodiment of the present invention. The wireless router 12 and the backbone router 13 shown in FIG. 1 are included in a router RT. in FIG. 5.

The plant operators operate the terminal 15 and instruct to validate the provisioning function of the wireless communication system 1. Then a provisioning validation signal is transmitted from the terminal 15 to the system manager 14 shown in FIG. 5 (Step S11). The system manager 14 receives the provisioning validation signal, and then the control signal instructing the start of the transmission of the advertisement A2 is transmitted to the router RT such as the wireless router 12 and the backbone router 13.

The router RT receives the control signal from the system manager 14, and then the router RT starts to transmit the advertisement A2 to the provisioning network NP. The provisioning function of the wireless communication system 1 is validated. The router RT transmits the advertisement A1 to the target network N1 at a pre-established interval in the previous time of receiving the control signal from the system manager 14. Thus, after receiving the control signal from the system manager 14, the transmission of the advertisement A1 to the target network N1 and the transmission of the advertisement A2 to the provisioning network NP are performed in parallel without interference. As described above, the validation of the provisioning function of the wireless communication system 1 is completed (Step S1).

Figure 6:
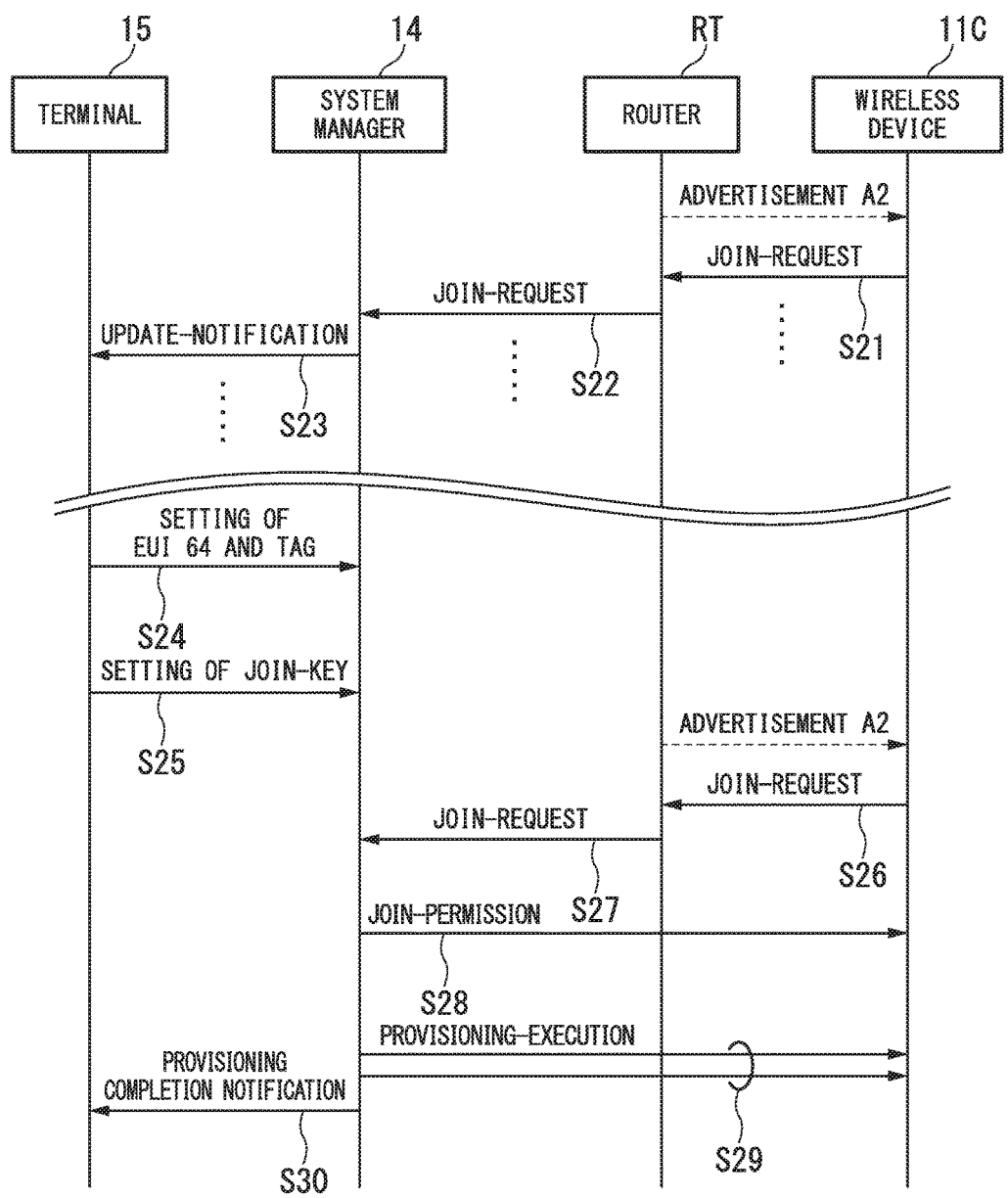
FIG. 6 is a timing diagram showing the processing regarding the provisioning performed in the wireless communication system according to the first embodiment of the present invention.

Next, as shown in FIG. 4, the processing to have the wireless device 11c join into the provisioning network NP is performed (Step S2). The plant operators turn on the power source of the wireless device 11c to start this operation. FIG. 6 is a timing diagram showing the processing regarding the provisioning in the wireless communication system according to one embodiment of the present invention. The wireless router 12 and the backbone router 13 shown in FIG. 1 are included in the router RT in FIG. 6.

The operators turn on the power source, then the wireless device 11c is in the state of waiting for the advertisement A2 received from the router RT. The wireless device 11c receives the advertisement A2 from the router RT, then the wireless device 11c transmits the join-request indicating the join-request into the provisioning network NP to the router RT such as the router RT transmitted the advertisement A2 which the wireless device 11c received (Step S21). The join-request includes the EUI 64 allocated to the wireless device 11c and the initial join key described above.

The router RT receives the join-request from the wireless device 11c and transmits the join-request to the system manager 1 (Step S22). The router RT performed the relay processing to relay the join-request received via the provisioning network NP into the target network N1, while continuing to relay the data via the target network N1.

The target network N1 receives the join-request from the wireless device 11c, and then the system manager 14 records the EUI 64 included in the received join-request into a delivery list and transmits a provisioning update notification indicating the update of the delivery list (Step S23). The delivery list shows a table of the wireless devices 11 which is joining or about to join into the target network N1 or the provisioning network NP.

The system manager 14 does not response to the join-request just by recording the EUI 64 of the wireless device 11c to a device list. In other words, the system manager 14 ignores or rejects the join-request. The provisioning information to be set for the wireless device 11c is not recorded in the system manager 14 because the EUI 64 and the tag information of the wireless device 11c are not mapped with each other, and the join key is not created. Thus, the wireless device 11c repeats the operation of transmitting the join-request which is the join-request into the provisional network NP, every time the wireless device 11c receives the advertisement A2 from the router RT.

The plant operators can know the modification of the device list when the provisioning update notification from the system manager 14 is displayed on the terminal 15. The plant operators operate the terminal 15 and map the EUI 64 of the wireless device 11c recorded on the device list and the tag information previously set to the system manager 14, then the contents of the mapping are transmitted from the terminal 15 to system manager 14 (Step S24).

The EUI 64 and the tag information of the wireless device 11c are mapped with each other, and then the terminal 15 performs the transmission processing to generate the join key and transmit the join key to the system manager 14 (Step S25). By the operation described above, the EUI 64 recorded on the device list and the join key, the network ID and the tag information are mapped with each other, they are recorded on the system manager 14 as the provisioning information. The terminal 15 generates the join key in this case, the system manager 14 may generate the join key.

When the wireless device 11c receives the advertisement A2 from the router RT after the provisioning information is recorded on the system manager 14, the wireless device 11c transmits the join-request indicating the join-request into the provisioning network NP to the router RT (Step S26). The router RT receives the join-request from the wireless device 11c, and transmits the join-request into the system manager 14 (Step S27).

The provisioning information to be set to the wireless device 11c by the processing described above is recorded on the system manager 14. Thus, the system manager 14 receives the join-request from the wireless device 11c, and transmits a joining-permission for the provisioning network NP to the wireless device 11c (Step S28). The router RT relays the joining-permission from the system manager 14 to the provisioning network NP, while continuing to relay the data via the target network N1. By the processing described above, the wireless device 11c can join into the provisioning network NP, and the processing having the wireless device 11c join into the provisioning network NP is completed (Step S2).

Then, the provisioning of the wireless device 11c is performed shown in FIG. 4 (Step S3). Specifically, as shown in FIG. 6, the system manager 14 reads the provisioning information to be set to the wireless device 11c recorded on the own device, and transmits the provisioning information to the wireless device 11c joined into the provisioning network NP (Step S29). Specifically, the provisioning information received from the system manager 14 is transmitted to the target network N1 via sequentially the backbone network N2 and the backbone router 13. The provisioning information is relayed or transferred to the wireless router 12 in the target network N1.

Then, the provisioning information is transferred to the wireless router 12 received the join-request from the wireless device 11c in Step S26, the wireless router 12 relays the provisioning information while continuing to relay the data via the target network N1. The wireless device 11c receives the provisioning information from the system manager 14, and then the wireless device 11c sets the provisioning information. By the processing described above, the provisioning for the wireless device 11c is completed.

When the provisioning for the wireless device 11c is completed, the system manager 14 transmits a provisioning completion notification to the terminal 15 (Step S30). The provisioning update notification from the system manager 14 is displayed on the terminal 15, and the plant operators can know the completion of the provisioning to the wireless device 11c. The provisioning to the wireless device 11c is completion as descripted above (Step S3).

The provisioning of the wireless device 11c is complete, and then the invalidation of the provisioning function of the wireless communication system 1 is performed. This processing is performed based on the instructions from the plant operators, in a similar way to the validation of the provisioning function. The plant operators operate the terminal 15 and instruct to invalidate of the provisioning function of the wireless communication system 1, and then a provisioning invalidation signal is transmitted from the terminal 15 to the system manager 14 shown in FIG. 5 (Step S13). The system manager 14 receives the provisioning invalidation signal, and then the control signal instructing a stop of the transmission of the advertisement A2 from the system manager 14 to the router RT such as the wireless router 12 and the backbone router 13 (Step S14).

The router RT receives the control signal from the system manager 14, and then the router RT stops to transmit the advertisement A2 to the provisioning network NP. Thus, the provisioning of the wireless communication system 1 is invalidated. After being invalidated of the provisioning function of the wireless communication system 1, the router RT transmits the advertisement A1 to the target network N1 at the pre-established interval. Thus, the invalidation of the provisioning function of the wireless communication system 1 is completed (Step S4).

After the processing described above is completed, for example, the joining processing of the wireless device 11c into the target network N1 is performed (Step S5). Specifically, after the completion of the provisioning, for example, the wireless device 11c goes into the waiting state of receiving the advertisement A1 transmitted from the router RT. The wireless device 11c receives the advertisement A1 from the router RT, and then transmits the join-request indicating the join-request into the target network N1 to the router RT which is the router RT transmitted the advertisement A1 received by the wireless device 11c. The join-request includes the provisioning information, such as the EUI 64, the join key, the network ID, and the tag information, which is set by the processing in Step S3 described above.

The router RT receives the join-request from the wireless device 11c, and then transmits the join-request into the system manager 14. The system manager 14 receives the join-request from the wireless device 11c. Then, the system manager 14 performs the authentication of the wireless device 11c by matching the provisioning information including the join-request and the provisioning information recorded on the own device. The system manager 14 permits to join the wireless device 11c transmitted the join-request when the authentication succeeded, or rejects to join the wireless device 11c when the authentication failed. The joining into the target network N1 is completed as described above (Step S5).

As described above, in the present first embodiment, the router RT such as the wireless router 12 and the backbone router 13 performs the relay processing to relay the provisioning data required to join the wireless device 11c into the target network N1 to the provisioning network NP, while continuing to relay the data via the target network N1. Thus, the provisioning such as the OTA provisioning can be performed without interference with the wireless communication in the target network N1.

In the present first embodiment, the provisioning can be performed by using the wireless communication system 1 itself which is operating. Thus, the provisioning device is not required to bring in the installed area of the wireless device 11c, as in the OOB provisioning. And thus, the provisioning can easily be performed regardless of whether or not the wireless device 11c being installed in the explosion-proof area or in the un-explosion-proof area.

In the first embodiment, the EUI 64 of the wireless device 11c is fetched and supplied to the system manager 14 via the provisioning networks NPs. The mapping the EUI 64 with the tag information, and the join key are fetched and supplied to the system manager 14 by the terminal 15 which is operated by a plant operator.

Thus, in the resent first embodiment, because the on-site operators do not need to hand over the information set to the wireless devices to the plant operators like a prior art. Therefore, the operators can prevent from occurring any of confusions if the information to be handed over is not handed over between the on-site workers and the plant operators.

Although the foregoing has been a description of the wireless relay device, the wireless communication system, and the information setting method according to one embodiment of the present invention, the present invention is not restricted by the above-stated embodiment and may be freely modified within the scope thereof. For example, in the above-stated embodiment, the description has been provided for the example of the wireless communication system for performing the wireless communications in conformance with ISA100.11a, but the present invention is applicable to a wireless communication system for performing wireless communications in conformance with WirelessHART (registered trademark).

In the above-stated embodiment, the description has been provided for the example where each of the backbone routers 13, the system manager 14, and the gateway 15 is realized as a separate apparatus. However, arbitrary more than two apparatuses among them can be realized as a single apparatus. In order to improve the reliability, the system manager 14 may be a duplexed system manager having an active manager and a standby manager.

DESCRIPTION OF REFERENCE SYMBOLS 1 wireless communication system
11c wireless devices
12 wireless router
13 backbone router
14 system manager
24 wireless relay device
25, 26 advertisement transmitter
A1, A2 advertisement
N1 target network
NP provisioning network
RT router

The invention claimed is:

1. A wireless relay device comprising:
a relay processor configured to relay setting data, which needs to have wireless devices join into a first wireless network, to a second wireless network assigned with an identifier different from that of the first wireless network, while the relay processor continues to relay data via the first wireless network;
a first advertisement transmitter configured to transmit, via the first wireless network to the wireless devices, a first advertisement used to communicably connect the wireless devices to the first wireless network, the wireless devices having been set with the setting data; and
a second advertisement transmitter configured to transmit, via the second wireless network to the wireless devices, a second advertisement used to communicably connect the wireless devices to the second wireless network, the wireless devices being set with the setting data,
wherein the second advertisement transmitter is configured to transmit the second advertisement to the second wireless network based on a control signal having been transmitted via the first wireless network while the first advertisement transmitter transmits periodically the first advertisement to the first wireless network,
wherein the relay processor is configured to relay, in the first wireless network, data indicating a join-request to join into the first wireless network in a case that the data as a response to the first-advertisement indicating the join-request has been transmitted from the wireless devices via the first wireless network, and
wherein the relay processor is configured to relay, to the first wireless network, the data indicating another join-request to join into the second wireless network in another case that the data as a response to the second advertisement indicating the other join-request has been transmitted from the wireless devices via the second wireless network.

2. A wireless communication system comprising:
a wireless relay device comprising a relay processor configured to relay setting data, which needs to have wireless devices join into a first wireless network, to a second wireless network assigned with an identifier different from that of the first wireless network, while the relay processor continues to relay data via the first wireless network; and
a management device configured to manage the first wireless network and the second wireless network,
wherein the wireless relay device further comprises:
a first advertisement transmitter configured to transmit, via the first wireless network to the wireless devices, a first advertisement used to communicably connect the wireless devices to the first wireless network, the wireless devices having been set with the setting data; and
a second advertisement transmitter configured to transmit, via the second wireless network to the wireless devices, a second advertisement used to communicably connect the wireless devices to the second wireless network, the wireless devices being set with the setting data,
wherein the second advertisement transmitter is configured to transmit the second advertisement to the second wireless network based on a control signal having been transmitted via the first wireless network while the first advertisement transmitter transmits periodically the first advertisement to the first wireless network,
wherein the relay processor is configured to relay, in the first wireless network, the data indicating a join-request to join into the first wireless network in a case that the data as a response to the first advertisement indicating the join-request has been transmitted from the wireless devices via the first wireless network, and
wherein the relay processor is configured to relay, to the first wireless network, the data indicating another join-request to join into the second wireless network in another case that the data as a response to the second advertisement indicating the other join-request has been transmitted from the wireless devices via the second wireless network.

3. The wireless communication system according to claim 2, wherein the management device is configured to transmit, to the wireless relay device, the control signal to control starting or stopping transmission of the second advertisement.

4. The wireless communication system according to claim 3, wherein the management device is configured to transmit the control signal to control starting or stopping transmission of the second advertisement, based on instructions from outside.

5. The wireless communication system according to claim 2, further comprising wireless devices configured to transmit the data indicating the join-request to join into the first wireless network to the wireless relay device in a case that the wireless devices receive the first advertisement which is transmitted from the wireless relay device with the setting data having been set, and configured to transmit the data indicating the join-request to join into the second wireless network to the wireless relay device in a case that the wireless devices receive the second advertisement which is transmitted from the wireless relay device with the setting data not having been set.

6. An information setting method comprising:

transmitting setting data, which needs to have wireless devices join into a first wireless network, to the first wireless network;

relaying the setting data via the first wireless network to a second wireless network while continuing to relay data via the first wireless network;

setting with the setting data to the wireless devices which is communicably connected to the second wireless network;

transmitting, via the first wireless network to the wireless devices, a first advertisement used to communicably connect the wireless devices to the first wireless network, the wireless devices having been set with the setting data;

transmitting, via the second wireless network to the wireless devices, a second advertisement used to communicably connect the wireless devices to the second wireless network, the wireless devices being set with the setting data; and transmitting the second advertisement to the second wireless network based on a control signal having been transmitted via the first wireless network while periodically transmitting the first advertisement to the first wireless network, wherein data indicating a join-request to join into the first wireless network is relayed in the first wireless network in a case that the data as a response to the first-advertisement indicating that the join-request has been transmitted from the wireless devices via the first wireless network, and wherein the data indicating another join-request to join into the second wireless network is relayed in the first wireless network in another case that the data as a response to the second advertisement indicating that the other join-request has been transmitted from the wireless devices via the second wireless network.

7. The information setting method according to claim 6, further comprising:

transmitting the setting data to the first wireless network;

relaying the setting data to the second wireless network; and having the wireless devices communicably connected to the second wireless network before setting with the setting data to the wireless devices.

8. The information setting method according to claim 6 wherein the wireless devices are set with the setting data, before transmitting the setting data to the first wireless network.

* * * * *